July 14, 1959　　　A. H. WARD　　　2,894,358
READILY DETACHABLE POTTED PLANT PROTECTOR
Filed April 9, 1958

United States Patent Office 2,894,358
Patented July 14, 1959

2,894,358

READILY DETACHABLE POTTED PLANT PROTECTOR

Annchen H. Ward, Florham Park, N.J.

Application April 9, 1958, Serial No. 727,488

3 Claims. (Cl. 47—34)

My invention relates in general to means to protect potted plants by supporting the stems and leaves thereof from injurious contact with the rim of the pot and the soil contained therein, and has particular reference to protective devices of this kind which are supported by the rim of the pot and are detachable therefrom.

In the raising of potted plants whose stems and leaves naturally hang low and tend to rest upon the rim of the flower pot, such as African violets, the stems and leaves become injured by absorption of certain harmful chemicals which are contained in the soil and become deposited on the pot rim.

It is the primary object of my present invention to provide a device of this kind which presents a sufficiently wide platform for protective support of the stems and leaves of a potted plant and, of great importance, which may be slipped around the bottom of a flowerpot in the process of application and removed by easy, safe two-handed manipulation.

Another object of the invention is to provide a plant protector of the improved type which is of such construction that watering of the plant and other usual care are made easy.

A still further object is to provide a protective device that is extremely simple in construction, inexpensive to manufacture, light in weight, and does not detract in any way from the attractive appearance of the plant it protects.

Other objects, advantages and features of the invention will become apparent as the following specific description is read in connection with the accompanying drawing, in which.

Figure 1:
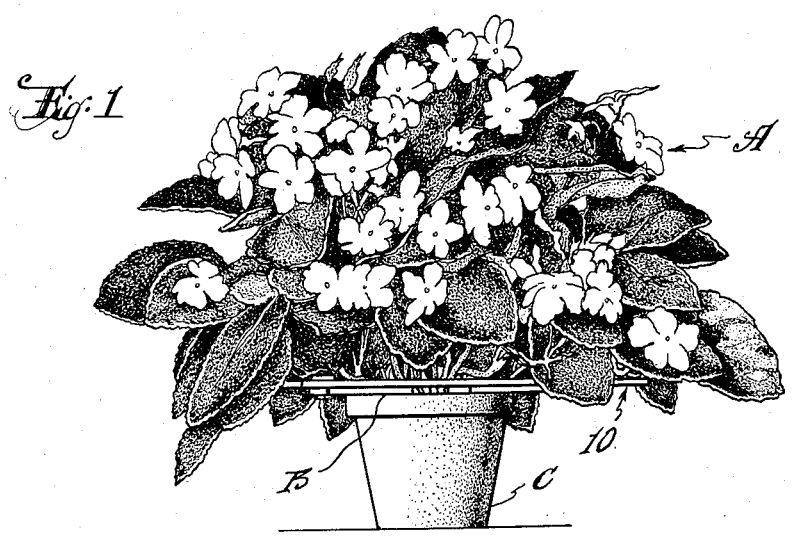
Fig. 1 is a side elevational view of a potted flowering plant having the protective platform applied thereto.

Referring now in detail to the drawing, wherein like reference characters designate corresponding parts in the several views, the assembled relation of my improved protective device to a potted African violet plant A is depicted in Fig. 1. The complete protective device comprises a platform 10 and means 11 to support said platform on the rim B of flowerpot C, in which position platform 10 underlies and in its turn supports the stems and leaves of plant A at a safe level out of injurious contact with flowerpot rim B.

Figure 2:
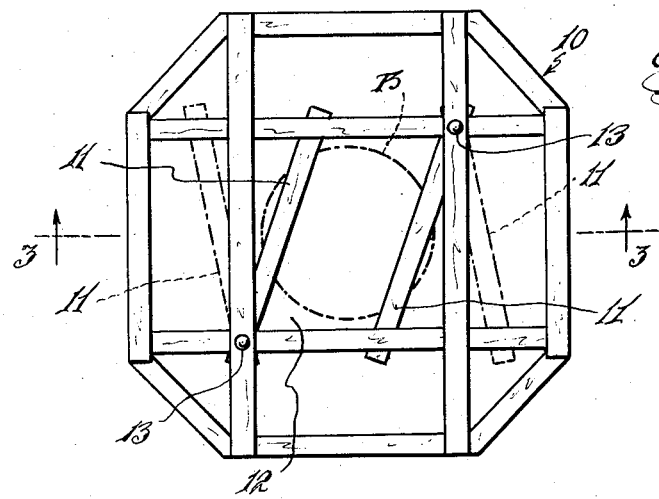
Fig. 2 is a plan view of the platform alone, showing the pivoted supporting members in operative position in solid lines and in inoperative position in broken lines.
Figure 3:
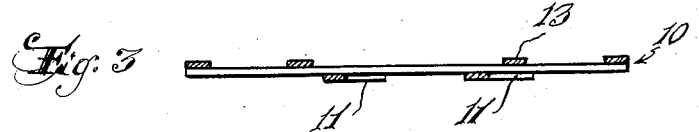
Fig. 3 is a transverse vertical section on line 3—3 of Fig. 2.

As shown particularly in Figs. 2 and 3, platform 10 is considerably larger in outside diameter than the rim B of flowerpot C in order that the horizontal supporting area afforded will underlie parts of the plant leaves as well as the stems. This will prevent the stems and leaves not only from coming into contact with flowerpot rim B but also from sagging and bending to such a degree that they will become unsightly and even broken. A central aperture 12 is provided in platform 10 to receive flowerpot C and is sufficiently larger than the outside diameter of rim B to permit said platform to be elevated above said rim after the entire flowerpot has been lowered through aperture 12.

Supporting means 11 for platform 10 preferably is in the form of at least one radially movable supporting member. In actual practice, I have been using a pair of supporting members 11, which preferably are in the form of straight, flat bars of sufficient thickness and rigidity to lie flat upon the rim B of flowerpot C and sustain the weight of platform 10 without becoming undesirably bent.

Each supporting member 11 is located underneath platform 10 and connected thereto for horizontal swinging adjustment on a vertical axis by suitable pivot means 13, which preferably is located diametrically opposite to the pivot means 13 of the other cooperative supporting member 11.

The mode of assembly of protective platform 10 with a potted plant A is to grasp flowerpot C with one hand and then, after lifting it above the stand or other supporting surface while in upright position, to engage the base of the flowerpot within aperture 12 in platform 10, while the latter is held in the other hand. Then, flowerpot C is replaced on the supporting surface and platform 10 is raised to a level slightly above the rim B of said flowerpot with one hand and by use of the other hand supporting members 11 are swung inwardly on their pivots until they rest upon said rim. Since supporting members 11 are located underneath platform 10, the latter protectively intervenes between said members and plant A so that there can be no abrasion or other injurious rubbing contact with its stems and leaves. The only contact between platform 10 and the plant stems and leaves is one of gentle upward pressure which cannot be harmful.

Concerning the material of which platform 10 is made, I am at the present time using split bamboo in its natural state, i.e. not painted or otherwise coated, but it is to be understood that any other suitable light material may be used. Bamboo is attractive in appearance, particularly when made into the lattice structure represented in the accompanying drawing. However, future use of plastic material and light sheet metal, such as aluminum, is contemplated. Plastic material of attractive colors and shades is available and may be chosen to harmonize with the plant foliage coloration. Such choice of materials and coloration also may be applied to the supporting members 11 and pivot means 13.

A latticed or otherwise perforate structure is desirable in fabrication of platform 10 in order to facilitate drainage when a plant is being watered and to provide adequate ventilation for the underneath stems and leaves.

It will be understood that it is intended to cover all changes and modifications of the example of the invention herein chosen for the purpose of illustration which do not constitute departures from the spirit of the invention and scope of the appended claims.

I claim:

1. A detachable pot-supported protector for potted plants comprising: a flat platform of a material non-injurious to plants adapted to be disposed in a horizontal applied position at a level slightly above the rim of a flower pot in supporting relation to the stems and leaves of a plant set therein to space the latter above the pot and soil contents, said platform having a central aperture of fixed diameter slightly in excess of the outside diameter of the rim of the pot whereby the platform may be moved into and out of applied position from beneath the pot; and at least one rigid platform-supporting member movably connected to the platform for horizontal adjustment substantially radial to the vertical platform axis between an inoperative position in which it clears the platform aperture and an operative position in which it crosses said aperture to rest upon the rim of the pot.

2. A detachable pot-supported protector for potted plants as defined in claim 1, wherein the platform-supporting member is in the form of a horizontal bar pivotally connected to the platform to swing on a vertical axis.

3. A detachable pot-supported protector for potted plants as defined in claim 2, wherein there are plural supporting members located underneath the platform to protect the plant from injurious contact with said members and having their points of pivotal connection to the platform arranged in diametrically balancing positions in relation to the platform orifice.

References Cited in the file of this patent

UNITED STATES PATENTS

| | | |
|---|---|---|
| 601,438 | Ericksson | Mar. 29, 1898 |
| 775,683 | Seelhorst | Nov. 22, 1904 |
| 2,785,508 | Coleman | Mar. 19, 1957 |